(12) United States Patent
Mizrahi et al.

(10) Patent No.: US 9,348,595 B1
(45) Date of Patent: May 24, 2016

(54) RUN-TIME CODE PARALLELIZATION WITH CONTINUOUS MONITORING OF REPETITIVE INSTRUCTION SEQUENCES

(71) Applicant: Centipede Semi Ltd., Netanya (IL)

(72) Inventors: Noam Mizrahi, Hod Hasharon (IL); Alberto Mandler, Zichron Yaakov (IL); Shay Koren, Tel-Aviv (IL); Jonathan Friedmann, Even Yehuda (IL)

(73) Assignee: CENTIPEDE SEMI LTD., Netanya (IL)

( * ) Notice: Subject to any disclaimer, the term of this patent is extended or adjusted under 35 U.S.C. 154(b) by 0 days.

(21) Appl. No.: 14/578,516

(22) Filed: Dec. 22, 2014

(51) Int. Cl.
*G06F 9/30* (2006.01)

(52) U.S. Cl.
CPC ........ *G06F 9/30181* (2013.01); *G06F 9/30065* (2013.01); *G06F 9/30098* (2013.01)

(58) Field of Classification Search
None
See application file for complete search history.

(56) References Cited

U.S. PATENT DOCUMENTS

| | | | |
|---|---|---|---|
| 5,394,529 A | 2/1995 | Brown, III et al. | |
| 5,488,729 A | 1/1996 | Vegesna et al. | |
| 5,488,730 A | 1/1996 | Brown, III et al. | |
| 5,966,537 A | 10/1999 | Ravichandran | |
| 5,974,538 A | 10/1999 | Wilmot, II | |
| 6,035,120 A * | 3/2000 | Ravichandran | 717/141 |
| 6,092,180 A | 7/2000 | Anderson et al. | |
| 6,157,998 A | 12/2000 | Rupley, II et al. | |
| 6,182,210 B1 | 1/2001 | Akkary et al. | |
| 6,202,205 B1 | 3/2001 | Saboff et al. | |
| 6,308,175 B1 | 10/2001 | Lang et al. | |
| 6,463,522 B1 | 10/2002 | Akkary | |
| 6,493,820 B2 | 12/2002 | Akkary et al. | |
| 6,505,345 B1 | 1/2003 | Chen et al. | |
| 6,516,409 B1 | 2/2003 | Sato | |
| 6,658,447 B2 | 12/2003 | Cota-Robles | |
| 6,772,324 B2 | 8/2004 | Akkary et al. | |
| 6,826,752 B1 | 11/2004 | Thornley et al. | |
| 7,065,759 B2 | 6/2006 | Hank | |
| 7,313,675 B2 | 12/2007 | Latorre et al. | |
| 7,313,676 B2 | 12/2007 | Brekelbaum et al. | |
| 7,366,880 B2 | 4/2008 | Chaudhry et al. | |
| 7,401,329 B2 | 7/2008 | De Rijck | |
| 7,434,032 B1 | 10/2008 | Coon et al. | |

(Continued)

FOREIGN PATENT DOCUMENTS

EP   2239657 B1   11/2012
EP   2778907 A2    9/2014

OTHER PUBLICATIONS

Ortiz-Arroyo et al., "Dynamic Simultaneous Multithreaded Architecture", Proceedings of ISCA's 16th International Conference on Parallel and Distributed Computing Systems (PDCS'03), 9 pages, year 2003.

(Continued)

*Primary Examiner* — William B. Partridge
(74) *Attorney, Agent, or Firm* — D. Kligler IP Services Ltd.

(57) ABSTRACT

A method includes, in a processor that executes instructions of program code, monitoring instructions of a repetitive sequence of the instructions that traverses a flow-control trace so as to construct a specification of register access by the monitored instructions. Based on the specification, multiple hardware threads are invoked to execute respective segments of the repetitive instruction sequence at least partially in parallel. Monitoring of the instructions continues in at least one of the segments during execution.

20 Claims, 2 Drawing Sheets

(56) References Cited

U.S. PATENT DOCUMENTS

| | | | |
|---|---|---|---|
| 7,478,198 | B2 | 1/2009 | Latorre et al. |
| 7,526,637 | B2 | 4/2009 | Jung et al. |
| 7,571,302 | B1 | 8/2009 | Chen et al. |
| 7,596,781 | B2 | 9/2009 | Fulton et al. |
| 7,650,485 | B1 | 1/2010 | Chou |
| 7,681,187 | B2 | 3/2010 | Ludwig et al. |
| 7,779,069 | B2 | 8/2010 | Frid-Nielsen et al. |
| 7,840,954 | B2 | 11/2010 | Gschwind |
| 7,882,381 | B2 | 2/2011 | Wyatt |
| 8,006,235 | B2 | 8/2011 | Broman et al. |
| 8,056,061 | B2 | 11/2011 | Lee et al. |
| 8,166,467 | B2 | 4/2012 | Biswas et al. |
| 8,181,170 | B2 | 5/2012 | Patil et al. |
| 8,185,882 | B2 | 5/2012 | Patel et al. |
| 8,196,117 | B2 | 6/2012 | Lafrance-Linden |
| 8,230,411 | B1 | 7/2012 | Vorbach et al. |
| 8,261,046 | B2 | 9/2012 | Gibert et al. |
| 8,291,197 | B2 * | 10/2012 | Wu et al. .................. 712/216 |
| 8,402,429 | B2 | 3/2013 | Kielstra |
| 8,438,370 | B1 | 5/2013 | Budge |
| 8,572,595 | B1 | 10/2013 | Lethin et al. |
| 8,612,949 | B2 | 12/2013 | Liao et al. |
| 8,667,471 | B2 | 3/2014 | Wintergerst et al. |
| 8,677,337 | B2 | 3/2014 | Song et al. |
| 8,719,806 | B2 | 5/2014 | Wang et al. |
| 8,843,901 | B2 | 9/2014 | Krajec et al. |
| 9,015,687 | B2 | 4/2015 | George |
| 9,170,792 | B2 | 10/2015 | Park et al. |
| 2002/0144092 | A1 * | 10/2002 | Topham et al. ............. 712/217 |
| 2003/0135711 | A1 | 7/2003 | Shoemaker et al. |
| 2003/0167460 | A1 | 9/2003 | Desai et al. |
| 2004/0073906 | A1 | 4/2004 | Chamdani et al. |
| 2004/0098570 | A1 | 5/2004 | Giri |
| 2004/0154010 | A1 | 8/2004 | Marcuello et al. |
| 2004/0193857 | A1 | 9/2004 | Miller et al. |
| 2005/0132376 | A1 | 6/2005 | Rodgers et al. |
| 2005/0172277 | A1 | 8/2005 | Chheda et al. |
| 2006/0026411 | A1 | 2/2006 | Yoshida |
| 2006/0047495 | A1 | 3/2006 | Sanchez et al. |
| 2006/0095732 | A1 | 5/2006 | Tran et al. |
| 2006/0227966 | A1 | 10/2006 | Knowles |
| 2008/0134196 | A1 | 6/2008 | Madriles et al. |
| 2008/0162272 | A1 | 7/2008 | Huang et al. |
| 2008/0163230 | A1 | 7/2008 | Latorre et al. |
| 2008/0167846 | A1 | 7/2008 | Bugenhagen |
| 2008/0307403 | A1 | 12/2008 | Heishi |
| 2008/0320276 | A1 | 12/2008 | Krottendorfer et al. |
| 2009/0063823 | A1 | 3/2009 | Burky et al. |
| 2009/0172362 | A1 | 7/2009 | Shen et al. |
| 2009/0228690 | A1 | 9/2009 | Muff et al. |
| 2009/0327674 | A1 | 12/2009 | Codrescu et al. |
| 2010/0161948 | A1 | 6/2010 | Abdallah |
| 2010/0269102 | A1 | 10/2010 | Latorre et al. |
| 2011/0161643 | A1 | 6/2011 | Eichenberger et al. |
| 2011/0167247 | A1 | 7/2011 | Gibbs et al. |
| 2011/0320787 | A1 | 12/2011 | Dieffenderfer et al. |
| 2012/0079146 | A1 | 3/2012 | Hesse |
| 2013/0125097 | A1 | 5/2013 | Ebcioglu et al. |
| 2013/0232476 | A1 | 9/2013 | Varma et al. |
| 2014/0019726 | A1 * | 1/2014 | Toi et al. .................. 712/221 |
| 2014/0215187 | A1 | 7/2014 | Yazdani |
| 2014/0281435 | A1 | 9/2014 | Perkins et al. |
| 2014/0282592 | A1 | 9/2014 | Abdallah |
| 2014/0282601 | A1 | 9/2014 | Abdallah |
| 2014/0317387 | A1 | 10/2014 | Abdallah |
| 2015/0220341 | A1 | 8/2015 | Onannessian |

OTHER PUBLICATIONS

Ortiz-Arroyo, D.,"Efficient Resource Allocation on a Dynamic Simultaneous Multithreaded Architecture", Computer Science and Engineering Department, Aalborg University, Denmark, 5 pages, year 2006.

Marcuello et al., "A Quantitative Assessment of Thread-Level Speculation Techniques", Proceedings of the 14th International Parallel and Distributed Processing Symposium, pp. 595-601, May 1-5, 2000.

Marcuello et al., "Thread-Spawning Schemes for Speculative Multithreading", Proceedings of the Eighth International Symposium on High-Performance Computer Architecture (HPC02), pp. 55-64, Feb. 2-6, 2002.

Marcuello et al., "Clustered Speculative Multithreaded Processors", Proceedings of the 13th international conference on Supercomputing (ICS '99), pp. 365-372, year 1999.

Marcuello et al., "Speculative Multithreaded Processors", Proceedings of the 12th international conference on Supercomputing (ICS '98), pp. 77-84, year 1998.

Cazorla et al., "Dynamically Controlled Resource Allocation in SMT Processors", Proceedings of the 37th International Symposium on Microarchitecture (MICRO-37'04), pp. 171-182, year 2004.

Akkary et al., "A Dynamic Multithreading Processor", Proceedings of the 31st annual ACM/IEEE international symposium on Microarchitecture (MICRO-31), pp. 226-236, Dec. 2, 1998.

Ranjan et al., "P-Slice Based Efficient Speculative Multithreading", International Conference on High Performance Computing (HiPC), pp. 119-128, Dec. 16-19, 2009.

Sohi et al., "Speculative Multithreaded Processors", IEEE Computer, vol. 34, issue 4, pp. 66-73, Apr. 2001.

Sohi et al., "Speculative Multithreaded Processors", Computer Sciences Department, University of Wisconsin-Madison, year 2001.

Roth et al., "Register Integration: A Simple and Efficient Implementation of Squash Reuse", Proceedings of the 33rd Annual International Symposium on Microarchitecture (MICRO-33), 12 pages, Dec. 10-13, 2000.

Roth, A., "Pre-Execuion via Speculative Data-Driven Multithreading", A dissertation submitted in partial fulfillment of the requirements for the degree of Doctor of Philosophy (Computer Sciences), University of Wisconsin Madison, 375 pages, year 2001.

Jacobson et al., "Path-Based Next Trace Prediction", Proceedings of Micro-30, 11 pages, Dec. 1-3, 1997.

Tubella et al., "Control Speculation in Multithreaded Processors through Dynamic Loop Detection", Proceedings of the 4th International High-Performance Computer Architecture Symposium, pp. 14-23, Feb. 1-4, 1998.

Zier et al., "Performance Evaluation of Dynamic Speculative Multithreading with the Cascadia Architecture", IEEE Transactions on Parallel and Distributed Systems, vol. 21, No. 1, pp. 47-59, Jan. 2010.

Zier, "The Dynamic Speculation and Performance Prediction of Parallel Loops", Dissertation for the degree of Doctor of Philosophy in Electrical and Computer Engineering, Oregon State University, 146 pages, May 1, 2009.

De Alba et al., "Characterization and Evaluation of Hardware Loop Unrolling", Boston Area Architecture Workshop (BARC-2003), 18 pages, Jan. 2003.

Collins et al., "Clustered Multithreaded Architectures-Pursuing Both IPC and Cycle Time", Proceedings of the 18th International Parallel and Distributed Processing Symposium, 10 pages, Apr. 2004.

Mizrahi et al., U.S. Appl. No. 14/578,518, filed Dec. 22, 2014.

Mizrahi et al., U.S. Appl. No. 14/583,119, filed Dec. 25, 2014.

Patel et al., "rePlay: A Hardware Framework for Dynamic Optimization", IEEE Transactions on Computers, vol. 50, No. 6, pp. 590-608, Jun. 2001.

Shen et al., "Modern Processing Design: Fundamentals of Superscalar Processors", Chapter 4.2, pp. 159-164, Oct. 9, 2002.

U.S. Appl. No. 14/583,119 Office Action dated Apr. 14, 2015.

U.S. Appl. No. 14/583,119 Office Action dated May 28, 2015.

U.S. Appl. No. 14/637,418 Office Action dated May 28, 2015.

Moseley et al., "Identifying potential parallelism via loop-centric profiling", ACM, 9 pages, May 7-9, 2007.

U.S. Appl. No. 14/578,518 Office Action dated Jun. 19, 2015.

U.S. Appl. No. 14/690,424 Office Action dated Aug. 27, 2015.

(56) References Cited

OTHER PUBLICATIONS

Mishra at al., "Specification-driven Directed Test Generation for Validation of Pipelined Processors", ACM Transactions on Design Automation of Electronic Systems, vol. 13, No. 3, article 42, pp. 42:1-42:36, Jul. 2008.

Rosner et al., "Power Awareness through Selective Dynamically Optimized Traces", Proceedings of the 31st annual international symposium on computer architecture, vol. 32, issue 2, 12 pages, Mar. 2004.

Sami et al., "Exploiting data forwarding to reduce the power budget of VLIW embedded processors", IEEE Proceedings of the Conference on Design, Automation and Test in Europe, Munich, Germany, pp. 252-257, Mar. 13-16, 2001.

Lazarescu et al., "Dynamic Trace-Based Data Dependency Analysis for Parallelization of C Programs", 2012 IEEE 12th International Working Conference on Source Code Analysis and Manipulation (SCAM), pp. 126-131, Sep. 23-24, 2012.

U.S. Appl. No. 14/690,424 Office Action dated Dec. 9, 2015.

International Application PCT/IB2015/059470 Search Report dated Mar. 29, 2016.

International Application PCT/IB2015/059469 Search Report dated Mar. 31, 2016.

International Application PCT/IB2015/059468 Search Report dated Apr. 7, 2016.

* cited by examiner

| Code in instructions | Dependencies between instructions |
|---|---|
| 1 mov r9, r2 | 1,2,3 depend on 3 from previous iteration |
| 2 ldrb r0, [r2] | 4 depends on 2 |
| 3 strb ip, [r2], #1 | 6 depends on 2 |
| 4 cmp r5, r0 | 3 depends on 6 from previous iteration |
| 5 beq outside_loop | |
| 6 mov ip, r0 | |
| 7 b 1 | |

| Cycles | TH1 | TH2 | TH3 | TH4 |
|---|---|---|---|---|
| 0 | 11,12,13 | | | |
| 1 | | 21,22 | | |
| 2 | | | | |
| 3 | | | | |
| 4 | 14,16 | | | |
| 5 | | 23,24,26 | | |
| 6 | | | 31,32,33 | |
| 7 | | | | 41,42 |
| 8 | | | | |
| 9 | | | | |
| 10 | | | 34,36 | |
| 11 | | | | 43,44,46 |

Two iterations in 6 cycles (average of 3 cycles/iteration)

RUN-TIME CODE PARALLELIZATION WITH CONTINUOUS MONITORING OF REPETITIVE INSTRUCTION SEQUENCES

CROSS-REFERENCE TO RELATED APPLICATIONS

This application is related to U.S. patent application Ser. No. 14/578,518, entitled "Register classification for run-time code parallelization," filed on even date, whose disclosure is incorporated herein by reference.

FIELD OF THE INVENTION

The present invention relates generally to processor design, and particularly to methods and systems for run-time code parallelization.

BACKGROUND OF THE INVENTION

Various techniques have been proposed for dynamically parallelizing software code at run-time. For example, Akkary and Driscoll describe a processor architecture that enables dynamic multithreading execution of a single program, in "A Dynamic Multithreading Processor," Proceedings of the 31$^{st}$ Annual International Symposium on Microarchitectures, December, 1998, which is incorporated herein by reference.

Marcuellu et al., describe a processor microarchitecture that simultaneously executes multiple threads of control obtained from a single program by means of control speculation techniques that do not require compiler or user support, in "Speculative Multithreaded Processors," Proceedings of the 12$^{th}$ International Conference on Supercomputing, 1998, which is incorporated herein by reference.

Marcuello and Gonzales present a microarchitecture that spawns speculative threads from a single-thread application at run-time, in "Clustered Speculative Multithreaded Processors," Proceedings of the 13$^{th}$ International Conference on Supercomputing, 1999, which is incorporated herein by reference.

In "A Quantitative Assessment of Thread-Level Speculation Techniques," Proceedings of the 14$^{th}$ International Parallel and Distributed Processing Symposium, 2000, which is incorporated herein by reference, Marcuello and Gonzales analyze the benefits of different thread speculation techniques and the impact of value prediction, branch prediction, thread initialization overhead and connectivity among thread units.

Ortiz-Arroyo and Lee describe a multithreading architecture called Dynamic Simultaneous Multithreading (DSMT) that executes multiple threads from a single program on a simultaneous multithreading processor core, in "Dynamic Simultaneous Multithreaded Architecture," Proceedings of the 16$^{th}$ International Conference on Parallel and Distributed Computing Systems (PDCS '03), 2003, which is incorporated herein by reference.

SUMMARY OF THE INVENTION

An embodiment of the present invention that is described herein provides a method including, in a processor that executes instructions of program code, monitoring instructions of a repetitive sequence of the instructions that traverses a flow-control trace so as to construct a specification of register access by the monitored instructions. Based on the specification, multiple hardware threads are invoked to execute respective segments of the repetitive instruction sequence at least partially in parallel. Monitoring of the instructions continues in at least one of the segments during execution.

In some embodiments, continuing to monitor the instructions includes, in response to detecting in a given segment a change to a different flow-control trace, creating and constructing a different specification for the different flow-control trace, by monitoring the instructions along the different flow-control trace. The method may include, after monitoring the different flow-control trace, saving the different specification or the different flow control trace.

In some embodiments, the repetitive sequence includes a loop or a function. In an embodiment, continuing to monitor the instructions includes continuing to monitor all the segments. Alternatively, continuing to monitor the instructions may include continuing to monitor at least a subset of the segments that follow the flow-control trace. Further alternatively, continuing to monitor the instructions may include selecting a partial subset of the segments, and continuing to monitor the segments in the selected subset. Selecting the subset may include selecting for continued monitoring every N$^{th}$ segment being created, selecting the segments for continued monitoring in accordance with a predefined periodic pattern, and/or selecting the segments for continued monitoring at random.

In some embodiments, the method includes terminating monitoring of the instructions in a given segment a given number of cycles, instructions or micro-ops after aborting of the repetitive sequence. In an example embodiment, the given number for the given segment is set based on the given number that was set for a different segment having a different control-flow trace.

There is additionally provided, in accordance with an embodiment of the present invention, a processor including an execution pipeline and a monitoring unit. The execution pipeline is configured to execute instructions of program code. The monitoring unit is configured to monitor the instructions of an identified repetitive sequence of the instructions that traverses a flow-control trace so as to construct a specification of register access by the monitored instructions, to invoke, based on the specification, multiple hardware threads in the execution pipeline to execute respective segments of the repetitive instruction sequence at least partially in parallel and to continue to monitor the instructions in at least one of the segments during execution.

There is also provided, in accordance with an embodiment of the present invention, a method including, in a processor that executes instructions of program code, monitoring instructions of a repetitive sequence of the instructions so as to construct a specification of register access by the monitored instructions. A termination criterion is evaluated based on the monitored instructions. If the termination criterion is met, monitoring of the instructions is terminated. If the monitoring of the instructions ends without meeting the termination criterion, execution of multiple segments of the repetitive instruction sequence is parallelized based on the specification.

In some embodiments, the termination criterion depends on a position of a last write to a register, a number of registers that were written to, a count of instructions or micro-ops, a count of execution cycles and/or a number of branch instructions exceeds a threshold. Additionally or alternatively, the termination criterion may depends on the monitoring reaching a location in the program code that was monitored previously, the monitoring reaching a location in the program code that is identified as repetitive, a branch mis-prediction occurring during or preceding the monitoring, and/or on a classification of one or more flags of the processor as global or global-local.

In an embodiment, the specification is uniquely associated with a flow-control trace traversed by the monitored instructions. In another embodiment, the specification is associated with two or more flow-control traces traversed by the monitored instructions.

In an embodiment, monitoring of the instructions is performed immediately following decoding of the instructions in an execution pipeline of the processor. In another embodiment, monitoring of the instructions is performed before execution of the instructions in an execution pipeline of the processor, including monitoring speculative instructions that will be subsequently flushed. In some embodiments, the method includes retaining respective names of the registers throughout the monitoring.

There is further provided, in accordance with an embodiment of the present invention, a method including, in a processor that executes instructions of program code, monitoring a repetitive sequence of the instructions and classifying registers accessed by the monitored instructions depending on a respective order in which each register is used as an operand or as a destination by the instructions. Execution of multiple segments of the repetitive sequence is parallelized based on classification of the registers.

In some embodiments, classifying the registers includes classifying at least some of the registers as one of: a local register whose first occurrence in the monitored sequence is as a destination; a global register that is used in the monitored sequence only as an operand; and a global-local register whose first occurrence in the monitored sequence is as an operand, and is subsequently used in the monitored sequence as a destination.

In an embodiment, classifying the registers includes classifying a given register as global-local if the given register first appears in the monitored sequence as a destination in a conditional instruction. In an embodiment, classifying the registers includes classifying a given register as global-local if the given register first appears in the monitored sequence as a destination in a conditional instruction, and otherwise classifying the given register as local provided that a condition of the conditional instruction is met.

In another embodiment, classifying the registers includes classifying a given register as global-local if the given register first appears in the monitored sequence as both a destination and an operand in the same instruction.

In some embodiments, classifying the registers further includes identifying, for at least a subset of the registers, respective locations in the monitored sequence of last write operations to the registers. In a disclosed embodiment, identifying the locations of the last write operations includes counting the writes to at least a subset of the registers. Alternatively, identifying the locations of the last write operations may include recording addresses of the last write operations.

In an embodiment, identification of the locations of the last write operations is performed for one or more flags of the processor in addition to the registers. In another embodiment, the subset of the registers includes at least the registers classified as local. In yet another embodiment, the subset of the registers includes at least the registers classified as global-local.

In an example embodiment, identification of the locations of the last write operations includes conditional write operations to the respective registers. In an embodiment, classification, depending on the order of use as operand or destination, is performed for one or more flags of the processor in addition to the registers.

There is additionally provided, in accordance with an embodiment of the present invention, a processor including an execution pipeline and a monitoring unit. The execution pipeline is configured to execute instructions of program code. The monitoring unit is configured to monitor the instructions in a repetitive sequence of the instructions so as to construct a specification of register access by the monitored instructions, to evaluate a termination criterion based on the monitored instructions, to terminate monitoring of the instructions if the termination criterion is met, and, if the monitoring of the instructions ends without meeting the termination criterion, to parallelize execution of multiple segments of the repetitive instruction sequence based on the specification.

There is also provided, in accordance with an embodiment of the present invention, a processor including an execution pipeline and a monitoring unit. The execution pipeline is configured to execute instructions of program code. The monitoring unit is configured to monitor a repetitive sequence of the instructions, to classify registers accessed by the monitored instructions depending on a respective order in which each register is used as an operand or as a destination by the instructions, and to parallelize execution of multiple segments of the repetitive sequence based on classification of the registers.

The present invention will be more fully understood from the following detailed description of the embodiments thereof, taken together with the drawings in which:

DETAILED DESCRIPTION OF EMBODIMENTS

Overview

Figures 1, 2:
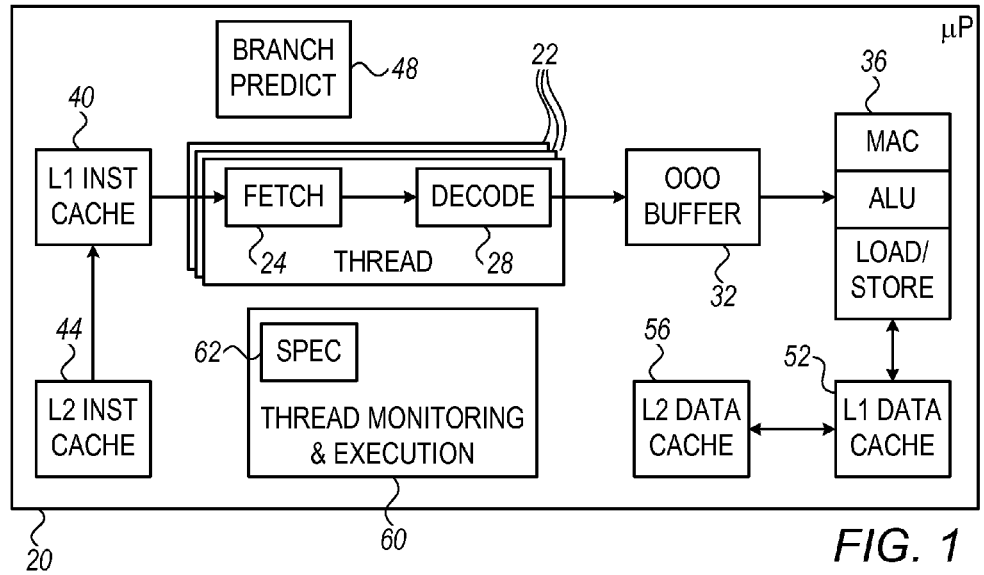
FIG. 1 is a block diagram that schematically illustrates a processor that performs run-time code parallelization, in accordance with an embodiment of the present invention.
FIG. 2 is a diagram that schematically illustrates run-time parallelization of a program loop, in accordance with an embodiment of the present invention.

Embodiments of the present invention that are described herein provide improved methods and devices for run-time parallelization of code in a processor. In the disclosed embodiments, the processor identifies a repetitive sequence of instructions, and creates and executes multiple parallel code sequences referred to as segments, which carry out different occurrences of the sequence. The segments are scheduled for parallel execution by multiple hardware threads.

For example, the repetitive sequence may comprise a loop, in which case the segments comprise multiple loop iterations, parts of an iteration or the continuation of a loop. As another example, the repetitive sequence may comprise a function, in which case the segments comprise multiple function calls, parts of a function or function continuation. The parallelization is carried out at run-time, on pre-compiled code. The term "repetitive sequence" generally referred to any instruction sequence that is revisited and executed multiple times.

In some embodiments, upon identifying a repetitive sequence, the processor monitors the instructions in the sequence and constructs a "scoreboard"—a specification of access to registers by the monitored instructions. The scoreboard is associated with the specific flow-control trace traversed by the monitored sequence. The processor decides how and when to create and execute the multiple segments based on the information collected in the scoreboard and the trace.

In some embodiments, the scoreboard comprises a classification of the registers accessed by the monitored instructions. The classification of a register depends on the order in which the register is used as an operand or as a destination in the monitored instructions.

In some embodiments, micro-ops, although distinct from instructions, are monitored in a similar manner to monitoring of instructions, as well. In other words, in some embodiments, the monitoring is performed and the scoreboard is produced with micro-op granularity rather than instruction granularity.

The classification may distinguish, for example, between local (L) registers whose first occurrence is as a destination, global (G) registers that are used only as operands, and global-local (GL) registers whose first occurrence is as operands and are subsequently used as destinations. Additionally or alternatively, the scoreboard may indicate, for at least some of the registers, the location in the monitored sequence of the last write operation to the register. This indication may comprise, for example, a count of the number of write operations to the register.

In some embodiments, the processor continues to monitor the instructions in one or more of the segments during execution. Such continued monitoring enables the processor to react quickly and efficiently to changes in the flow-control trace that may occur in the monitored segments, e.g., as a result of data-dependent conditional branch instructions. Several examples of selection criteria, which the processor may use for selecting segments for continued monitoring, are described herein.

In some embodiments, the processor terminates and aborts monitoring of a certain segment before the segment ends. Various termination criteria that can be used by the processor are described herein. Additional disclosed techniques maintain multiple simultaneous scoreboards for multiple respective flow-control traces, and alternate between them as appropriate.

Processor Architecture

FIG. 1 is a block diagram that schematically illustrates a processor 20, in accordance with an embodiment of the present invention. Processor 20 runs pre-compiled software code, while parallelizing the code execution. Parallelization decisions are performed by the processor at run-time, by analyzing the program instructions as they are fetched from memory and decoded.

In the present example, processor 20 comprises an execution pipeline that comprises one or more fetching units 24, one or more decoding units 28, an Out-of-Order (OOO) buffer 32, and execution units 36. In the example of FIG. 1, the execution pipeline comprises multiple hardware threads 22, each comprising a respective fetching unit 24 and a respective decoding unit 28. Fetching units 24 fetch program instructions from a multi-level instruction cache memory, which in the present example comprises a Level-1 (L1) instruction cache 40 and a Level-2 (L2) instruction cache 44.

A branch prediction unit 48 predicts the flow-control traces (referred to herein as "traces" for brevity) that are expected to be traversed by the program during execution. The predictions are typically based on the addresses or Program-Counter (PC) values of previous instructions fetched by fetching units 24. Based on the predictions, branch prediction unit 48 instructs fetching units 24 which new instructions are to be fetched. The flow-control predictions of unit 48 also affect the parallelization of code execution, as will be explained below.

Instructions decoded by decoding units 28 are stored in OOO buffer 32, for out-of-order execution by execution units 36, i.e., not in the order in which they have been compiled and stored in memory. Alternatively, the buffered instructions may be executed in-order. The buffered instructions are then issued for execution by the various execution units 36. In the present example, execution units 36 comprise one or more Multiply-Accumulate (MAC) units, one or more Arithmetic Logic Units (ALU) and one or more Load/Store units. Additionally or alternatively, execution units 36 may comprise other suitable types of execution units, for example Floating-Point Units (FPU).

The results produced by execution units 36 are stored in a register file and/or a multi-level data cache memory, which in the present example comprises a Level-1 (L1) data cache 52 and a Level-2 (L2) data cache 56. In some embodiments, L2 data cache memory 56 and L2 instruction cache memory 44 are implemented as separate memory areas in the same physical memory, or simply share the same memory without fixed pre-allocation.

In some embodiments, processor 20 further comprises a thread monitoring and execution unit 60 that is responsible for run-time code parallelization. In the example of FIG. 1, unit 60 maintains a specification 62, referred to herein as a scoreboard. The functions of unit 60 are explained in detail below.

The configuration of processor 20 shown in FIG. 1 is an example configuration that is chosen purely for the sake of conceptual clarity. In alternative embodiments, any other suitable processor configuration can be used. For example, in the configuration of FIG. 1, multi-threading is implemented using multiple fetch units 24 and multiple decoding units 28. Each hardware thread may comprise a fetch unit assigned to fetch instructions for the thread and a decoding unit assigned to decode the fetched instructions. Additionally or alternatively, multi-threading may be implemented in many other ways, such as using multiple OOO buffers, separate execution units per thread and/or separate register files per thread. In another embodiment, different threads may comprise different respective processing cores.

As yet another example, the processor may be implemented without cache or with a different cache structure, without branch prediction or with a separate branch prediction per thread. The processor may comprise additional elements such as reorder buffer (ROB), register renaming, to name just a few. Further alternatively, the disclosed techniques can be carried out with processors having any other suitable micro-architecture.

Processor 20 can be implemented using any suitable hardware, such as using one or more Application-Specific Integrated Circuits (ASICs), Field-Programmable Gate Arrays (FPGAs) or other device types. Additionally or alternatively, certain elements of processor 20 can be implemented using software, or using a combination of hardware and software elements. The instruction and data cache memories can be implemented using any suitable type of memory, such as Random Access Memory (RAM).

Processor 20 may be programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Run-Time Code Parallelization

In some embodiments, unit 60 in processor 20 identifies repetitive instruction sequences and parallelizes their execution. Repetitive instruction sequences may comprise, for example, respective iterations of a program loop, respective occurrences of a function or procedure, or any other suitable sequence of instructions that is revisited and executed multiple times. In the present context, the term "repetitive instruction sequence" refers to an instruction sequence whose flow-control trace (e.g., sequence of PC values) has been executed in the past at least once. Data values (e.g., register values) may differ from one execution to another.

In the disclosed embodiments, processor 20 parallelizes a repetitive instruction sequence by invoking and executing multiple code segments in parallel or semi-parallel using multiple hardware threads. Each thread executes a respective code segment, e.g., a respective iteration of a loop, multiple (not necessarily successive) loop iterations, part of a loop iteration, continuation of a loop, a function or part or continuation thereof, or any other suitable type of segment.

Parallelization of segments in processor 20 is performed using multiple hardware threads. In the example of FIG. 1, although not necessarily, each thread comprises a respective fetch unit 24 and a respective decoding unit 28 that have been assigned by unit 60 to perform one or more segments.

In practice, data dependencies exist between segments. For example, a calculation performed in a certain loop iteration may depend on the result of a calculation performed in a previous iteration. The ability to parallelize segments depends to a large extent on such data dependencies.

FIG. 2 is a diagram that demonstrates run-time parallelization of a program loop, in accordance with an example embodiment of the present invention. The top of the figure shows an example program loop (reproduced from the bzip benchmark of the SPECint test suite) and the dependencies between instructions. Some dependencies are between instructions in the same loop iteration, while others are between an instruction in a given loop iteration and an instruction in a previous iteration.

The bottom of the figure shows how unit 60 parallelizes this loop using four threads TH1 . . . TH4, in accordance with an embodiment of the present invention. The table spans a total of eleven cycles, and lists which instructions of which threads are executed during each cycle. Each instruction is represented by its iteration number and the instruction number within the iteration. For example, "14" stands for the 4$^{th}$ instruction of the 1$^{st}$ loop iteration. In this example instructions 5 and 7 are neglected and perfect branch prediction is assumed.

The staggering in execution of the threads is due to data dependencies. For example, thread TH2 cannot execute instructions 21 and 22 (the first two instructions in the second loop iteration) until cycle 1, because instruction 21 (the first instruction in the second iteration) depends on instruction 13 (the third instruction of the first iteration). Similar dependencies exist across the table. Overall, this parallelization scheme is able to execute two loop iterations in six cycles, or one iteration every three cycles.

It is important to note that the parallelization shown in FIG. 2 considers only data dependencies between instructions, and does not consider other constraints such as availability of execution units. Therefore, the cycles in FIG. 2 do not necessarily translate directly into respective clock cycles. For example, instructions that are listed in FIG. 2 as executed in a given cycle may actually be executed in more than one clock cycle, because they compete for the same execution units 36.

Parallelization Based on Segment Monitoring

In some embodiments, unit 60 decides how to parallelize the code by monitoring the instructions in the processor pipeline. In response to identifying a repetitive instruction sequence, unit 60 starts monitoring the sequence as it is fetched, decoded and executed by the processor.

In some implementations, the functionality of unit 60 may be distributed among the multiple hardware threads, such that a given thread can be viewed as monitoring its instructions during execution. Nevertheless, for the sake of clarity, the description that follows assumes that monitoring functions are carried out by unit 60.

As part of the monitoring process, unit 60 generates the flow-control trace traversed by the monitored instructions, and a monitoring table that is referred to herein as a scoreboard. The scoreboard comprises a respective entry for each register that appears in the monitored sequence. In an embodiment, unit 60 classifies each register as Global (G), Local (L) or Global-Local (GL), and indicates the classification in the corresponding entry in the scoreboard. The classification of a register as G, L or GL depends on the order in which the register is used as an operand (whose value is read) and/or as a destination (to which a value is written) in the monitored sequence.

In an embodiment, a local (L) register is defined as a register whose first occurrence in the monitored sequence is as a destination (subsequent occurrences, if any, may be as operand and/or destination). A Global (G) register is defined as a register that is used in the monitored sequence only as an operand, i.e., the register is read but never written to. A global-local (GL) register is defined as a register whose first occurrence in the monitored sequence is as an operand, and is later used in the monitored sequence as a destination. The first and subsequent occurrences may occur in different instructions or in the same instruction, as long as the order between "first" and "subsequent" is preserved.

In an alternative embodiment, an exception to the above classification concerns a conditional instruction that uses a register as a destination. If such an instruction is the first occurrence of the register in the monitored instructions, then the register is classified as GL. Otherwise, the register is classified as local (L) as per the above rules. For example, register r2 in the instruction "mov_cond r2,#5" would be classified as GL if this instruction is the first write to r2 in the monitored instructions, and classified as L otherwise. In an alternative embodiment, if such an instruction is the first occurrence of the register in the monitored instructions, then the register is classified as GL. Otherwise, the register is classified as local only if the condition of the instruction is met. If not, the register is not classified.

In an embodiment, unit 60 uses superset classification, i.e., merges together two or more of the classes defined above. In such an embodiment, even if a given register is only local in a given segment, unit 60 still classifies it as GL for simplifying control.

An alternative way of defining the classification of registers as G, L or GL is classifying a register depending on where the dependencies of the register are generated and used relative to the currently-monitored segment: An operand that is generated outside the currently-monitored segment is classified as Global (G) or Global-Local (GL). An operand that is generated inside the currently-monitored segment is classified as Local (L).

In some embodiments, unit 60 finds and indicates in the scoreboard, for at least some of the registers, the location of the last write to the register in the monitored sequence. This indication is used by unit 60 during execution for deciding when to issue instructions in subsequent segments that depend on this last write. The rationale behind this mechanism is that an instruction in segment X that depends on the value of a register in a previous segment Y can be issued only after the last write to that register in the execution of segment Y.

In one embodiment, the last-write indication is implemented by counting the number of times that the register was written to in the monitored sequence. Unit 60 determines this count (denoted #WRITES) and indicates the #WRITES value in the entry of the register in the scoreboard.

In this embodiment, when executing segment Y, unit 60 counts the number of writes to the register in question. When the count reaches the #WRITES value indicated in the scoreboard, unit 60 concludes that the last write was encountered, and it is therefore permitted to issue for execution instructions in segment X which depend on the register in question.

One known solution for mitigating data dependencies is to rename registers, i.e., assign a given register different names in different segments. In some embodiments, unit 60 refrains from renaming registers, i.e., retains the register names across the different iterations of the repetitive sequence, in order to facilitate counting of #WRITES. In other words, unit 60 maintains alignment of the register renaming map between segments and threads.

The #WRITES mechanism described above is depicted only as an example of a mechanism for finding and indicating the location of the last write to a register in the monitored sequence. In alternative embodiments, unit 60 may find and indicate in the scoreboard the location of the last write to a register in any other suitable way, for example by recoding in the scoreboard the address of the last write operation to the register.

In various embodiments, unit 60 does not necessarily need to count #WRITES for every register. For example, unit 60 may count #WRITES for the registers classified as GL, for the registers classified as L, or both.

In some embodiments, unit 60 includes in the count of #WRITES conditional write instructions, regardless of whether the condition is met or not. In other embodiments, unit 60 includes a conditional write instruction in the count of #WRITES only when the condition is met and the write is actually performed.

In some embodiments, processor 20 maintains one or more flags that are used in conditional instructions. Examples of flags include a zero flag ("true" if the result of the most recent arithmetic operation was zero, "false" otherwise), a negative flag ("true" if the result of the most recent arithmetic operation was negative, "false" otherwise), a carry flag ("true" if the most recent addition operation produced a carry, "false" otherwise), an overflow flag ("true" if the most recent addition operation caused an overflow, "false" otherwise), or any other suitable flag. Typically, the flags are implemented as respective bits in a dedicated flags register. The flags are updated by various instructions or micro-ops.

In some embodiments, unit 60 monitors the flags and includes them in the scoreboard in a similar manner to monitoring of registers. For example, unit 60 may classify the flags as G, L or GL as explained above. Additionally or alternatively, unit 60 may count and record the position of the last write to each flag in the monitored sequence (e.g., by counting and recording #WRITES for the flags).

In some embodiments, unit 60 does not always necessarily monitor an entire segment from start to end. In an example embodiment, unit 60 may monitor (e.g., count writes and/or classify registers) from a certain middle point in a segment, and updates an existing scoreboard.

Continuous Monitoring of Multiple Traces

In some embodiments, unit 60 continues to monitor the instructions in one or more of the threads during their execution. In other words, the monitoring process does not end once the repetitive instruction sequence has been identified and monitored. Unit 60 continues the monitoring and scoreboard construction process, for at least some of the threads, during execution. As noted above, the functionality of unit 60 may be distributed among the threads, such that each thread (or at least a subset of the threads) monitors the instructions it executes.

Continuous monitoring of segments during execution is important, for example, for efficient handling of scenarios in which the program execution switches from one flow-control trace to another at run-time. In many practical scenarios, the program alternates between two or more repetitive instruction sequences having different traces. In some embodiments, unit 60 handles such scenarios by creating and maintaining multiple different scoreboards in parallel, a respective scoreboard for each trace.

Figure 3:
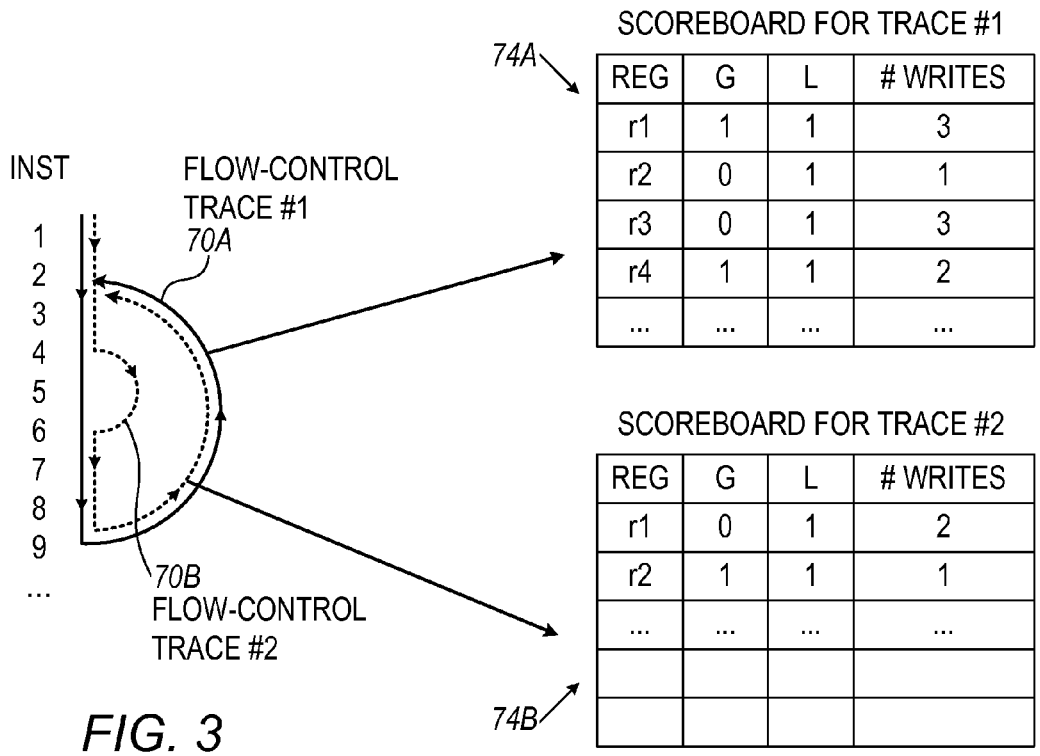
FIG. 3 is a diagram that schematically illustrates a program loop having multiple traces and respective scoreboards, in accordance with an embodiment of the present invention.

FIG. 3 is a diagram that schematically illustrates a program loop having multiple traces and respective scoreboards, in accordance with an embodiment of the present invention. The left-hand-side of the figure illustrates a section of code having nine instructions. A program loop starts at instruction 2 and loops back at instruction 9.

In this example, instruction 4 is a conditional branch instruction that jumps to instruction 6 and skips instruction 5. Thus, depending on the outcome of the conditional branch instruction, some segments will follow a trace denoted 70A (branch not taken) and other threads will follow a trace denoted 70B (branch taken).

In some embodiments, unit 60 monitors at least some of the segments during their execution. When detecting that a monitored segment begins to follow a previously-unknown trace, unit 60 creates a separate scoreboard for the new trace and records register classification and #WRITES as explained above. In the present example, unit 60 creates and maintains a scoreboard 74A for trace 70A, and a scoreboard 74B for trace 70B.

By maintaining multiple scoreboards, unit 60 is able to react quickly to trace changes. As long as a segment follows a previously-monitored trace, unit 60 already has a valid scoreboard for this trace. As a result, unit 60 is able to invoke new segments immediately using the available scoreboard. Without this mechanism, invocation of new segments would be delayed until the scoreboard for the new trace is constructed (meaning that efficiency is degraded and that the processor assumes, perhaps erroneously, that the trace it is monitoring is new).

The multiple-trace scenario of FIG. 3 is a simple example scenario that is depicted in order to demonstrate the mechanisms of continuous monitoring and multiple scoreboards. The disclosed technique can be used in any other suitable type of scenario in which execution alternates between multiple flow-control traces.

Figure 4:
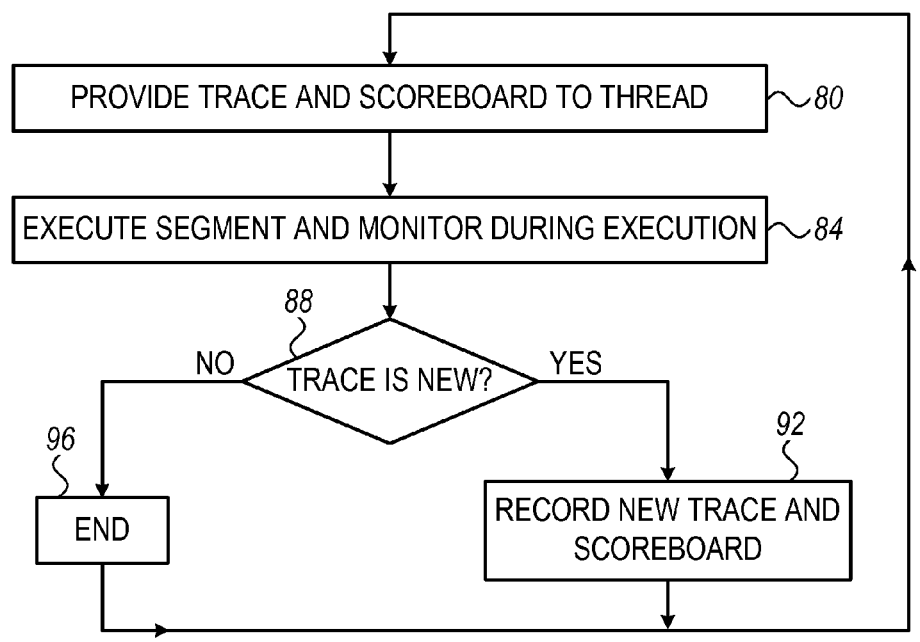
FIG. 4 is a flow chart that schematically illustrates a method for continuous monitoring of repetitive instruction sequences, in accordance with an embodiment of the present invention.

FIG. 4 is a flow chart that schematically illustrates a method for continuous monitoring of repetitive instruction sequences, in accordance with an embodiment of the present invention. The figure illustrates combined execution and monitoring in a given thread. Unit 60 typically performs this process for any sequence that is selected for monitoring, not necessarily for every segment being executed.

The method begins with unit 60 providing a given trace and a corresponding scoreboard to a given hardware thread, at an initiation step 80. The thread in question executes the segment and in parallel performs monitoring, at an execution & monitoring step 84. As part of the monitoring process the thread generates a scoreboard for the trace it follows.

After completing execution of the segment, unit 60 checks whether the trace is new, at a checking step 88. In other words, unit 60 checks whether a scoreboard already exists for this trace. If the trace is new, unit 60 records the scoreboard constructed for this trace, at a recording step 92. This scoreboard will be provided to subsequent threads that follow the same trace. Otherwise, i.e., if a scoreboard already exists, the method ends at an end step 96.

In some embodiments, a scoreboard is uniquely associated with a single flow-control trace. In other embodiments, a given scoreboard may be associated with two or more traces.

In some embodiments unit 60 monitors every segment during execution, for example using the method of FIG. 4. In alternative embodiments, unit 60 may choose to monitor only a subset of the segments. By controlling the number and identities of the segments chosen for monitoring, it is possible to set different trade-offs between computational overhead and parallelization performance.

Unit 60 may use various criteria or logic for selecting which segments to monitor. For example, unit 60 may choose segments for monitoring periodically, e.g., every $N^{th}$ segment being invoked (for some selected constant N). In another embodiment, unit 60 may choose to monitor segments in accordance with a predefined deterministic pattern, e.g., segments 2, 3, 5, 12, 13, 15, 22, 23, 25, . . . . As another example, unit 60 may choose segments for monitoring at random, e.g., skip a random number of segments, choose a segment for monitoring, skip another random number of segments, choose a segment for monitoring, and so on.

As yet another example, unit 60 may choose a segment for monitoring in response to some predefined event that occurs during execution of the segment. Since different threads may follow different flow-control traces, unit 60 may choose to monitor segments that follow a particular trace of interest. Further alternatively, unit 60 may select segments for monitoring during execution using any other suitable criteria.

In an embodiment, monitoring by unit 60 is performed on the instructions at the output of decoding module 28. At this point in the pipeline, the instructions are still speculative, in the sense that some of the decoded instructions will be flushed and not committed. Flushing may occur, for example, due to branch mis-prediction. Nevertheless, it is preferable to monitor instructions at this early stage because the instructions are still organized in-order. Moreover, monitoring instructions early in the pipeline enables unit 60 to make use of the scoreboard (i.e., invoke parallel segments with the scoreboard) with lower latency.

Monitoring Termination Criteria

In some embodiments, unit 60 terminates monitoring of a given segment before the end of the segment. Various termination criteria can be evaluated and used by unit 60 for this purpose. Several non-limiting examples of termination criteria may comprise:

The number of writes to a register exceeds a threshold.
The number of registers that were written to exceeds a threshold.
The count of instructions or micro-ops exceeds a threshold.
The count of execution cycles exceeds a threshold.
The number of branch instructions exceeds a threshold.
The monitoring reached a location in the program code that was monitored previously.
The monitoring reaches a location in the program code that is identified as repetitive (e.g., a backward branch or branch link—BL).
A branch mis-prediction occurs in one of the instructions in the monitoring or in the instructions preceding the monitoring.
The flags are GL or global.

Further alternatively, any other suitable termination criteria can be used.

Although the embodiments described herein mainly address general purpose processors, the methods and systems described herein can also be used in other applications, such as in Graphics Processing Units (GPUs) or other dedicated processors.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A processor, comprising:
a processing pipeline comprising multiple hardware threads and configured to execute pre-compiled software code instructions that are stored in a memory;
multiple registers, configured to be read and written to by the processing pipeline during execution of the instructions; and
a monitoring unit, which is configured to monitor execution of the instructions by the processing pipeline and to record, while the processing pipeline executes a sequence of the instructions, a first flow control trace traversed by the sequence and a first monitoring table indicating the registers accessed by the processing pipeline in executing the instructions in the sequence according to the first flow control trace, and which is configured to parallelize among the hardware threads of the processor, using the first monitoring table, execution of first repetitions of the sequence in accordance with the first flow control trace,
wherein the monitoring unit is configured to detect, while the processing pipeline executes the sequence of the instructions, a second flow control trace traversed by the sequence, different from the first flow control trace, and to record a second monitoring table indicating the registers accessed by the processing pipeline in executing the instructions in the sequence according to the second flow control trace, and is configured to parallelize among the hardware threads of the processor, using the second monitoring table, the execution of second repetitions of the sequence in accordance with the second flow control trace, wherein the first and second monitoring tables comprise, for each register written to by the processing pipeline in executing the instructions in the sequence, a record of the last instruction in the sequence at which the processing pipeline wrote to the register.

2. The processor according to claim 1, wherein the monitoring unit is configured to decide, during the execution of each of the repetitions, when to issue the instructions with regard to a given register in subsequent repetitions based on the record of the last instruction at which the processing pipeline wrote to the given register.

3. The processor according to claim 2, wherein the record of the last instruction comprises a count of a number of times that each register was written to by the processing pipeline in executing the instructions in the sequence, and wherein the monitoring unit is configured to determine, in each of the repetitions, that the last instruction has been written to the given register by counting writes in each of the repetitions up to the count in the record.

4. The processor according to claim 1, wherein the monitoring unit is configured to alternate between the execution of the first repetitions, using the first monitoring table, and the second repetitions, using the second monitoring table.

5. The processor according to claim 4, wherein the execution alternates between the first and second repetitions depending upon a conditional branch instruction in the sequence.

6. The processor according to claim 1, wherein the sequence comprises a loop or a function.

7. The processor according to claim 1, wherein the monitoring unit is configured to continue to monitor the execution of the instructions during all the repetitions of the sequence.

8. The processor according to claim 1, wherein the monitoring unit is configured to select a subset of the repetitions of the sequence, and to continue to monitor the execution of the instructions only within the selected subset.

9. The processor according to claim 8, wherein the monitoring unit is configured to select the subset by performing at least one of:

selecting for continued monitoring every $N^{th}$ repetition;

selecting the repetitions for continued monitoring in accordance with a predefined periodic pattern; and selecting the repetitions for continued monitoring at random.

10. The processor according to claim 1, wherein the monitoring unit is configured to terminate monitoring of the instructions in the sequence in accordance with a predefined termination criterion before the sequence ends.

11. A method for operating a processing pipeline that includes multiple hardware threads and is configured to execute pre-compiled software code instructions that are stored in a memory while reading and writing to multiple registers during execution of the instructions, the method including:

monitoring execution of the instructions by the processing pipeline and recording, while the processing pipeline executes a sequence of the instructions, a first flow control trace traversed by the sequence and a first monitoring table indicating the registers accessed by the processing pipeline in executing the instructions in the sequence according to the first flow control trace;

parallelizing among the hardware threads of the processor, using the first monitoring table, execution of first repetitions of the sequence in accordance with the first flow control trace;

while the processing pipeline executes the sequence of the instructions, detecting a second flow control trace traversed by the sequence, different from the first flow control trace;

recording a second monitoring table indicating the registers accessed by the processing pipeline in executing the instructions in the sequence according to the second flow control trace; and parallelizing among the hardware threads of the processor, using the second monitoring table, the execution of second repetitions of the sequence in accordance with the second flow control trace, wherein the first and second monitoring tables comprise, for each register written to by the processing pipeline in executing the instructions in the sequence, a record of the last instruction in the sequence at which the processing pipeline wrote to the register.

12. The method according to claim 11, wherein parallelizing the execution comprises deciding, during the execution of each of the repetitions, when to issue the instructions with regard to a given register in subsequent repetitions based on the record of the last instruction at which the processing pipeline wrote to the given register.

13. The method according to claim 12, wherein the record of the last instruction comprises a count of a number of times that each register was written to by the processing pipeline in executing the instructions in the sequence, and wherein deciding when to issue the instructions comprises determining, in each of the repetitions, that the last instruction has been written to the given register by counting writes in each of the repetitions up to the count in the record.

14. The method according to claim 11, wherein parallelizing the execution comprises alternating between the execution of the first repetitions, using the first monitoring table, and the second repetitions, using the second monitoring table.

15. The method according to claim 14, wherein the execution alternates between the first and second repetitions depending upon a conditional branch instruction in the sequence.

16. The method according to claim 11, wherein the sequence comprises a loop or a function.

17. The method according to claim 11, wherein monitoring the execution comprises continuing to monitor the execution of the instructions during all the repetitions of the sequence.

18. The method according to claim 11, wherein monitoring the execution comprises selecting a subset of the repetitions of the sequence, and continuing to monitor the execution of the instructions only within the selected subset.

19. The method according to claim 18, wherein the selecting the subset comprises performing at least one of:

selecting for continued monitoring every $N^{th}$ repetition;

selecting the repetitions for continued monitoring in accordance with a predefined periodic pattern; and selecting the repetitions for continued monitoring at random.

20. The method according to claim 11, and comprising terminating monitoring of the instructions in the sequence in accordance with a predefined termination criterion before the sequence ends.

* * * * *